(12) United States Patent
Schrom et al.

(10) Patent No.: US 6,801,026 B2
(45) Date of Patent: Oct. 5, 2004

(54) HYSTERETIC DC-DC CONVERTERS

(75) Inventors: Gerhard Schrom, Hillsboro, OR (US);
Jae-Hong Hahn, Hillsboro, OR (US);
Peter Hazucha, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 10/326,738

(22) Filed: Dec. 20, 2002

(65) Prior Publication Data

US 2004/0120169 A1 Jun. 24, 2004

(51) Int. Cl.$^7$ ................................................. G05F 1/59
(52) U.S. Cl. ........................ 323/272; 323/284; 363/65
(58) Field of Search .............................. 323/272, 282, 323/284; 363/65

(56) References Cited

U.S. PATENT DOCUMENTS

| | | | | |
|---|---|---|---|---|
| 6,043,634 A | * | 3/2000 | Nguyen et al. | 323/272 |
| 6,366,069 B1 | * | 4/2002 | Nguyen et al. | 323/282 |
| 6,489,756 B2 | * | 12/2002 | Kanouda et al. | 323/284 |
| 6,518,738 B1 | * | 2/2003 | Wang | 323/284 |
| 6,577,109 B2 | * | 6/2003 | Dancy et al. | 323/272 |
| 6,580,258 B2 | * | 6/2003 | Wilcox et al. | 323/282 |
| 6,605,931 B2 | * | 8/2003 | Brooks | 323/272 |
| 6,650,556 B2 | * | 11/2003 | Dinh et al. | 363/65 |
| 6,674,274 B2 | * | 1/2004 | Hobrecht et al. | 323/285 |

* cited by examiner

Primary Examiner—Jeffrey Sterrett
(74) Attorney, Agent, or Firm—Buckley, Maschoff & Talwalkar LLC (57) ABSTRACT

According to some embodiments, a plurality of single-phase hysteretic converters operate in accordance with associated synchronization signals.

33 Claims, 13 Drawing Sheets

PRIOR ART

PRIOR ART

HYSTERETIC DC-DC CONVERTERS

BACKGROUND

A power converter, such as a Direct Current (DC) to DC power converter for a microprocessor, may need to provide precise output voltage control (e.g., any output voltage ripple may need to be small), high efficiency, and fast transient response (e.g., the speed at which the converter responds when an output voltage rises too high or falls too low). Similarly, a maximum input current ripple and an overall size requirement may be imposed on the converter. Moreover, operating supply voltages for microprocessors and associated circuits have decreased, resulting in increased supply currents. The costs required to support these increased currents (e.g., via motherboards, sockets, and/or packages) have also increased.

Figure 1:
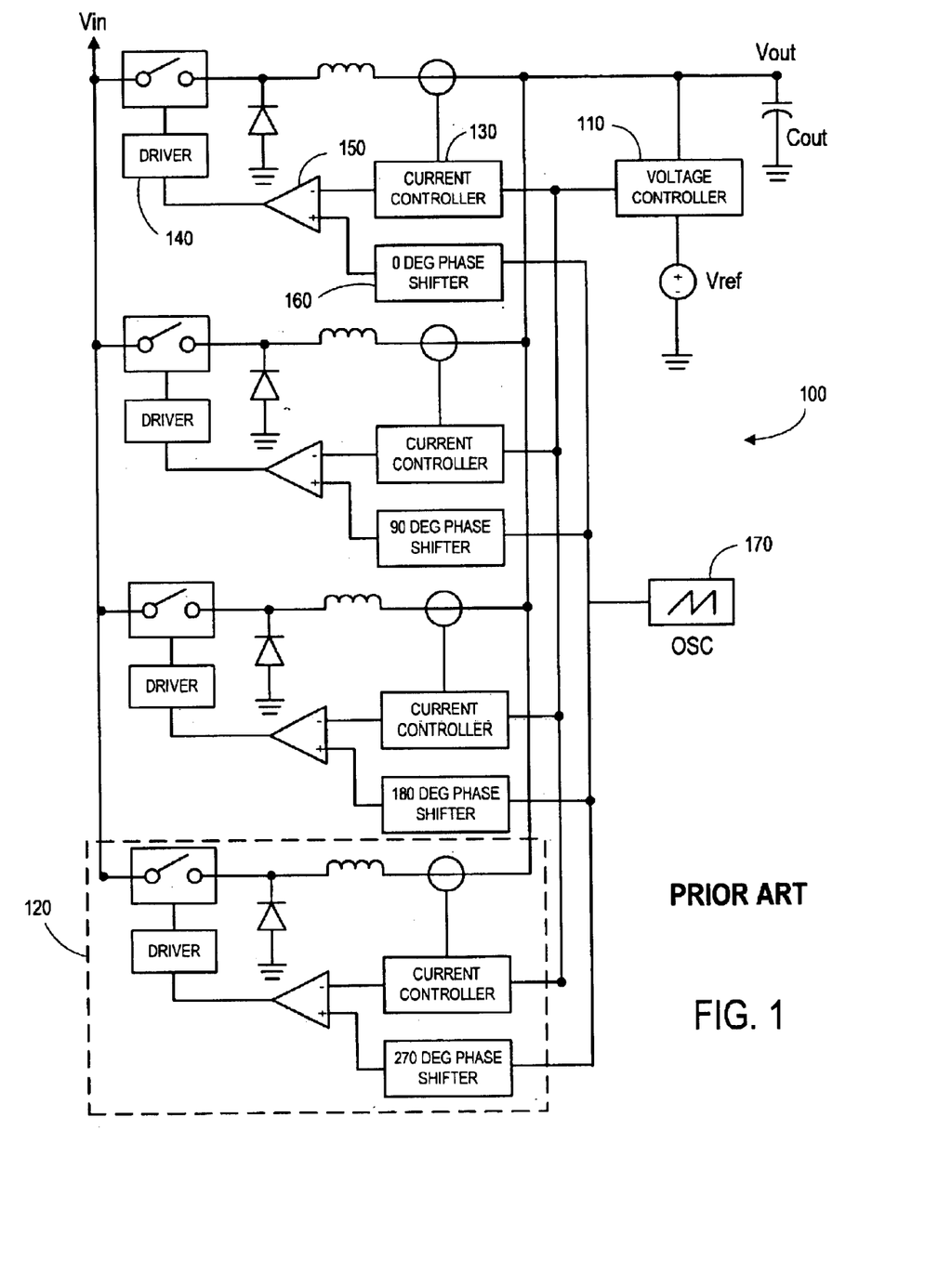
FIG. 1 is a diagram of a traditional PWM multi-phase DC-DC converter.

One approach to providing an appropriate power converter is to use several smaller converter modules, each operating at the same frequency but at different phases. For example, FIG. 1 is a diagram of a traditional Pulse Width Modulated (PWM) multi-phase DC-DC converter 100 that senses output voltage ($V_{OUT}$) and output current. In particular, a voltage controller 110 compares $V_{OUT}$ with a reference voltage ($V_{REF}$) to generate a voltage error signal. The voltage error signal is then used as a current reference by each converter module 120 (e.g., each of the four converter modules 120 illustrated in FIG. 1).

A current controller 130 compares a module's output current with the reference current and generates a control signal that is used by a PWM modulator to determine a duty cycle to drive a bridge (e.g., via a driver 140). Each PWM modulator includes a comparator 150 and a phase shifter 160 that receives a sawtooth waveform from an oscillator 170 (e.g., a waveform having a relatively large amplitude—such as several volts). In particular, the four phase shifters 160 illustrated in FIG. 1 shift the waveform by 0, 90, 180 and 270 degrees. Note that the waveform from the oscillator 170 is injected after $V_{OUT}$ and $V_{REF}$ have been amplified.

Such a PWM converter 100 may provide small input current ripple and output voltage ripple. This approach, however, can suffer from slow transient response (e.g., orders of magnitude slower than what might be required for a microprocessor).

Figure 2:
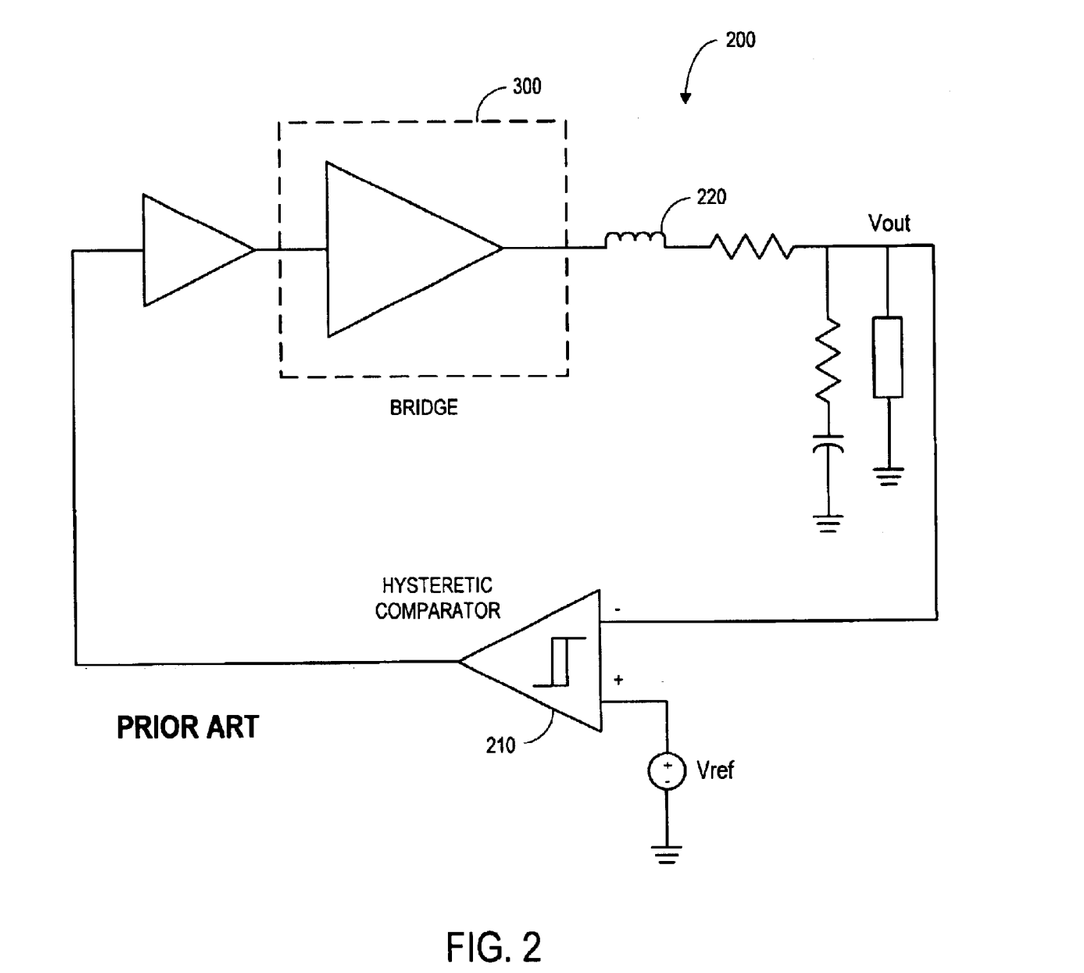
FIG. 2 is a diagram of a traditional hysteretic DC-DC converter.
Figure 3:
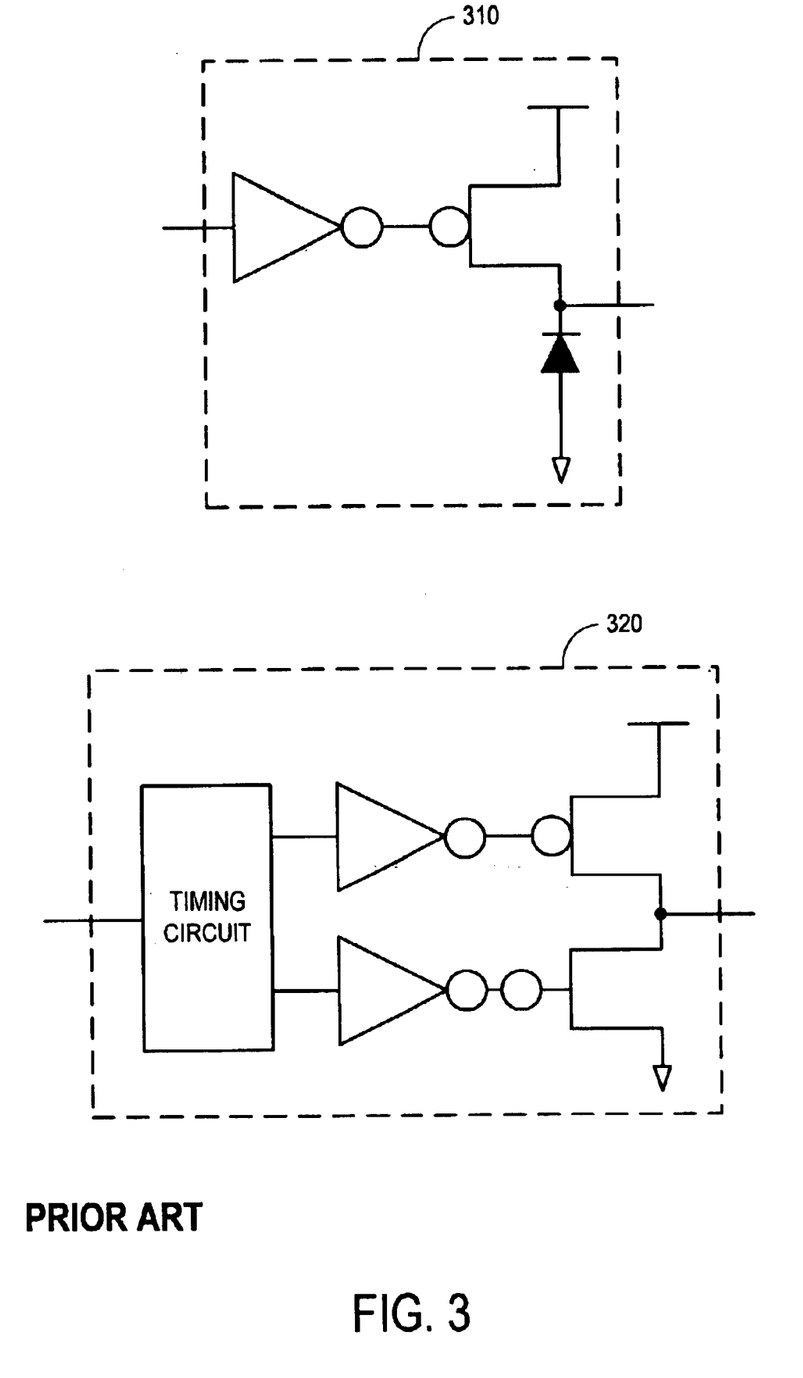
FIG. 3 illustrates some known switching bridges.

As another approach, a hysteretic converter (e.g., a "bang-bang" converter) may provide faster transient response. For example, FIG. 2 is a diagram of a traditional hysteretic DC-DC converter 200. Note that the converter's feedback loop includes a generic switching bridge 300. FIG. 3 illustrates some known switching bridges 310, 320. In particular, the first switching bridge 310 comprises a p-channel Metal-Oxide-Semiconductor (PMOS) device and a diode. The second switching bridge 320 comprises a PMOS device and an n-channel MOS (NMOS) device.

Referring again to FIG. 2, the hysteretic DC-DC converter 200 further includes a hysteretic comparator 210 that receives a reference voltage ($V_{REF}$) via a first input. If an output voltage ($V_{OUT}$) crosses one of the thresholds determined by the hysteresis window around $V_{REF}$, the comparator 210 flips and rapidly pulls $V_{OUT}$ inside the window. For example, if $V_{OUT}$ drops below the window's lower threshold, the control circuit turns on the switching bridge 300 and connects the inductor 220 to the positive input power supply. Despite the advantage of a fast transient response, however, the switching frequency of the converter 200 is sensitive to circuit component parameters (e.g., there is no provision for externally setting the phase and frequency at which the converter 200 operates). As a result, the switching times of several identical converters 200 operating in parallel may be substantially the same—causing them to operate as a large single-phase converter (and producing a large output voltage ripple).

It is also known that voltage mode control may be used to reduce the sensitivity of a traditional hysteretic DC-DC converter 200 (e.g., by using an error amplifier to compare $V_{OUT}$ and $V_{REF}$). This approach, however, may reduce the transient response time of the circuit. Similarly, it is know that $V^2$ mode control may be used to improve load current transient characteristics. In this case, however, the switching frequency and stability of the circuit may depend on output filter characteristics, such as the Equivalent Series Resistance (ESR) and the Equivalent Series Inductance (ESL) of an output capacitor, and any stray inductance and/or resistance associated with the supply path.

DETAILED DESCRIPTION

Some embodiments described herein are directed to a "power converter." As used herein, the phrase "power converter" may refer to, for example, a DC-DC power converter. Moreover, according to some embodiments the power converter provides an output voltage for a "loading circuit." As used herein, the phrase "loading circuit" may refer to, for example, a microprocessor core, a cache, Input Output (IO) buffers, or any other type of circuit.

Multi-Phase Hysteretic Converter

Figure 4:
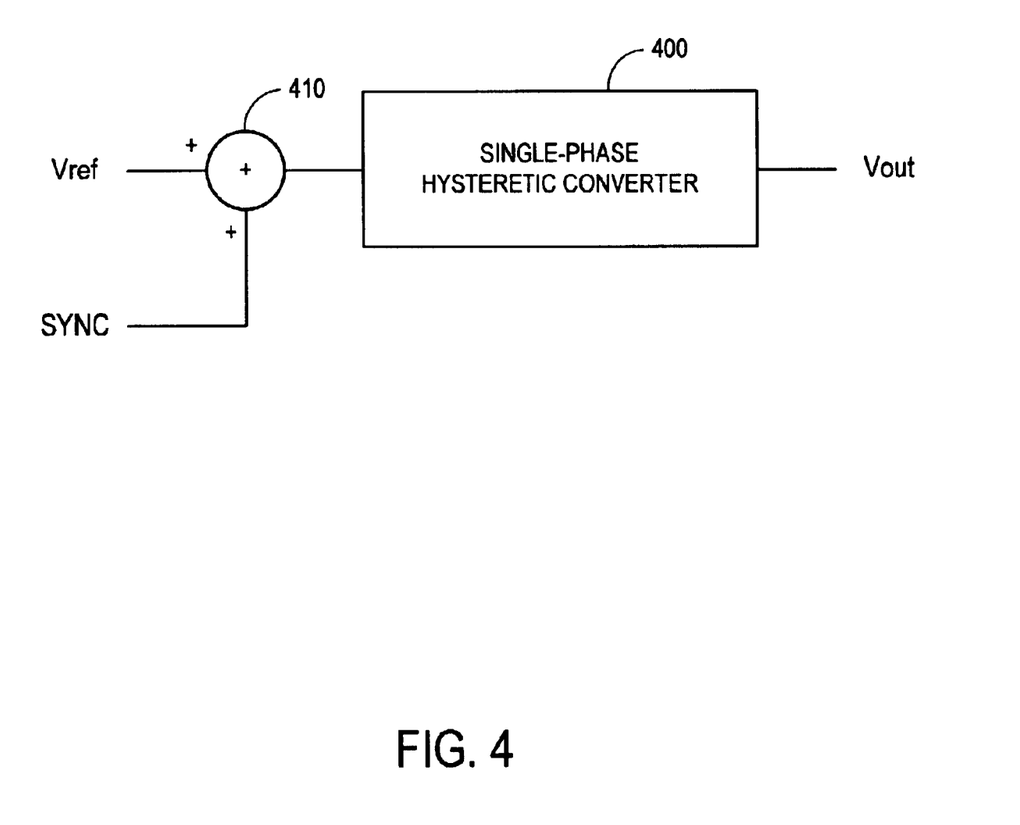
FIG. 4 is a block diagram illustrating a single-phase hysteretic converter according to some embodiments.

FIG. 4 is a block diagram illustrating a single-phase hysteretic converter 400 according to some embodiments. The converter 400 may be similar to the circuit shown in FIG. 2. That is, the converter 400 may include an output voltage line to provide $V_{OUT}$, a hysteretic comparator 210, and a switching bridge 300. As before, the switching bridge 300 may receive a signal associated with an output of the hysteretic comparator 210 and provide a signal associated with $V_{OUT}$ and a second input of the hysteretic comparator.

In this embodiment, however, the converter 400 also operates in accordance with a synchronization signal (SYNC). According to one embodiment, an adder 410 superimposes the synchronization signal on $V_{REF}$ (e.g., and is supplied via the first input of the hysteretic comparator). Note that the adder 410 may be incorporated within the converter 400 or be an external circuit or device. Moreover, there are any number of other ways that the synchronization signal could be provided to the converter 400 (e.g., the signal might be subtracted from $V_{REF}$ or incorporated into the feedback voltage of the converter 400). Also note that the synchronization signal may be added to $V_{REF}$ (or $V_{OUT}$) before any voltage error calculation.

According to some embodiments, the synchronization signal has a relatively small magnitude with respect to $V_{REF}$—such as 100 millivolts (mV)—and is associated with the width of hysteresis window of the hysteretic comparator. Moreover, the frequency of the synchronization signal may be selected to be below a natural oscillation frequency of the regulator (i.e., the frequency of oscillations when no synchronization signal is applied). The synchronization signal may have, for example, a triangular shape. According to other embodiments, the synchronization signal instead has another shape. For example, the synchronization signal may be a sawtooth or staircase signal.

As a result, the converter 400 may switch when the synchronization signal crosses the hysteresis window thresholds. That is, the output voltage ripple may introduce an offset to the synchronization signal. This offset may effectively delay or advance the switching time, modulate the duty cycle, and set the loop gain of the converter 400. Note that the hysteresis window and amplitude of the synchronization signal may be properly select to achieve an acceptable output voltage ripple, transient response time, and stable oscillations.

Figure 5:
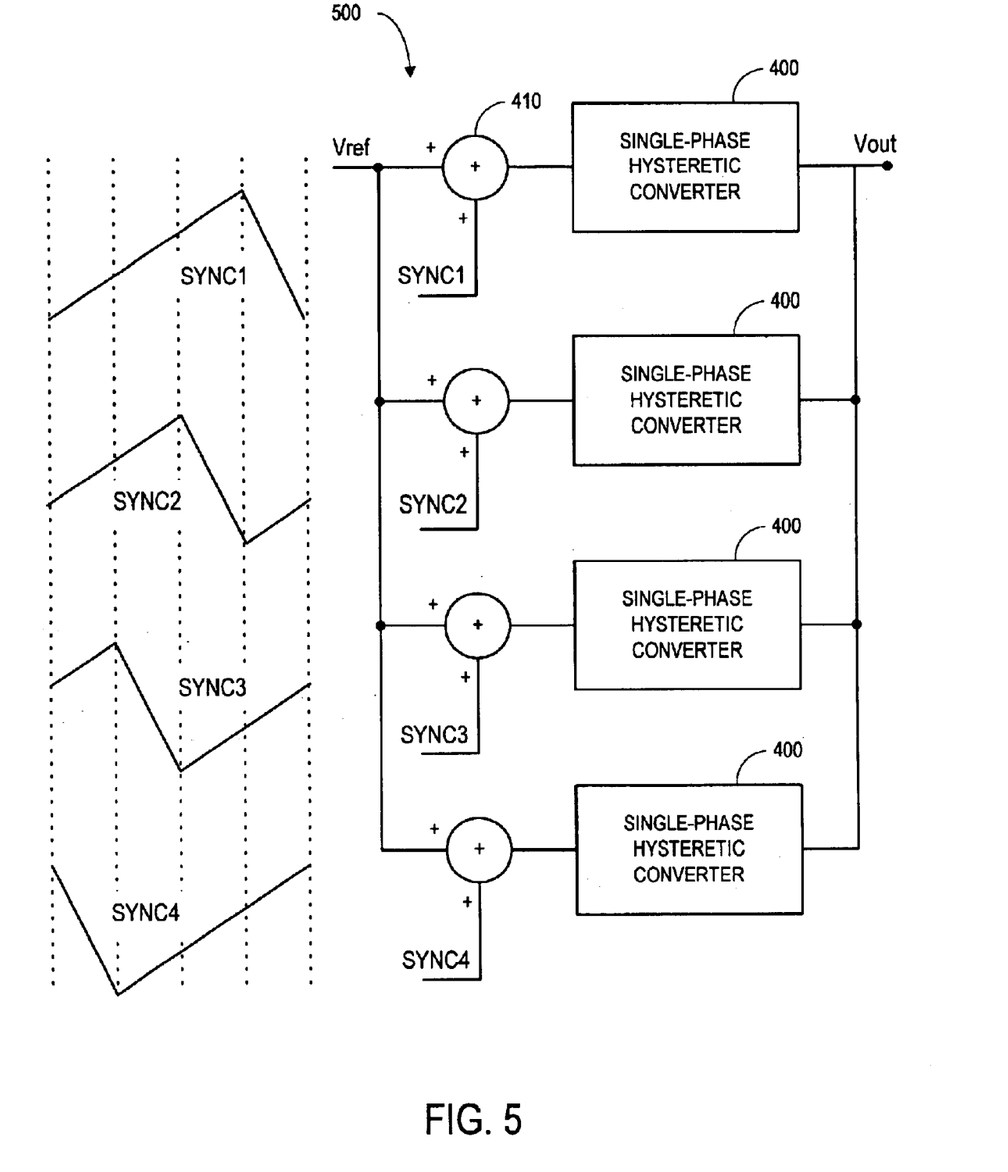
FIG. 5 is a block diagram of a multi-phase hysteretic converter according to some embodiments.

FIG. 5 is a block diagram of a multi-phase hysteretic converter 500 according to some embodiments. In particular, the converter 500 has a reference voltage line to receive $V_{REF}$ and an output voltage line to provide $V_{OUT}$. In addition, the multi-phase converter 500 includes four single-phase hysteretic converters 400 operating in parallel. Note that any number of single-phase converters 400 may be used instead (e.g., more than ten single-phase converters 400 may operate in parallel). Also note that the hysteretic comparators used in the single-phase converters 400 may be faster than operational amplifiers associated with PWM converters.

As illustrated in FIG. 5, the outputs of the single-phase converters 400 may be shorted at the output voltage line. According to some embodiments, additional circuitry may provide equal sharing of current among the single-phase converters 400.

Each of the single-phase converters 400 is associated with a synchronization signal (SYNC1 through SYNC4), and the synchronization signals may be phase-shifted such that the distribution of the synchronization signals over a clock period is substantially uniform. According to one embodiment, a separate adder 410 superimposes one of the synchronization signals on $V_{REF}$ for each of the single-phase converters 400.

Figure 6:
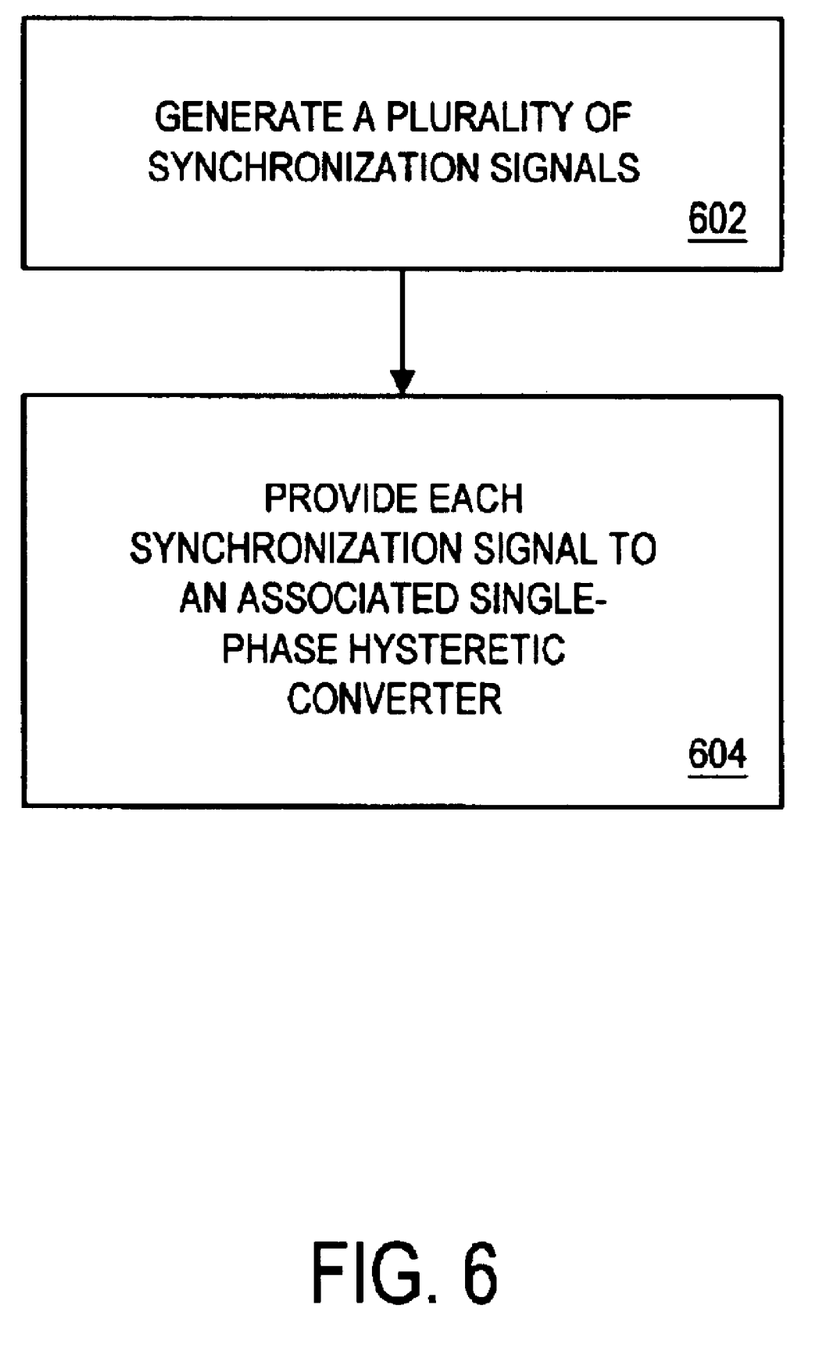
FIG. 6 is a flow chart of a method according to some embodiments.

FIG. 6 is a flow chart of a method according to some embodiments. The flow chart does not imply a fixed order to the actions, and embodiments may be practiced in any order that is practicable. At 602, a plurality of synchronization signals are generated. At 604, each synchronization signal is provided to an associated single-phase hysteretic converter 400 (e.g., by adding the signals to a $V_{REF}$ that is provided to a plurality of single-phase converters 400 operating in parallel). According to some embodiments, the synchronization signals are phase shifted such that the distribution of the synchronization signals over a clock period is substantially uniform. As a result, a power converter with high efficiency, small input current ripple, small output voltage ripple, and improved transient response may be provided.

According to some embodiments, a multi-phase converter integrated in a microprocessor die may receive a $V_{REF}$ several time higher (e.g., two or three times higher) than a supplied $V_{OUT}$ (e.g., a voltage provided to a core, cache, and/or 10 buffer). As a result, proportionately lower current might be supplied to the microprocessor die. The lower current might alleviate power deliver bottlenecks (e.g., the series inductance and resistance of package, socket, and/or circuit board traces). Moreover, because the Alternating Current (AC) and DC voltage droop on the series parasitics may decrease, less de-coupling capacitance may be required for the package and circuit board —potentially resulting in reduced system cost.

Improved Hysteretic Converter Circuits

Figure 7:
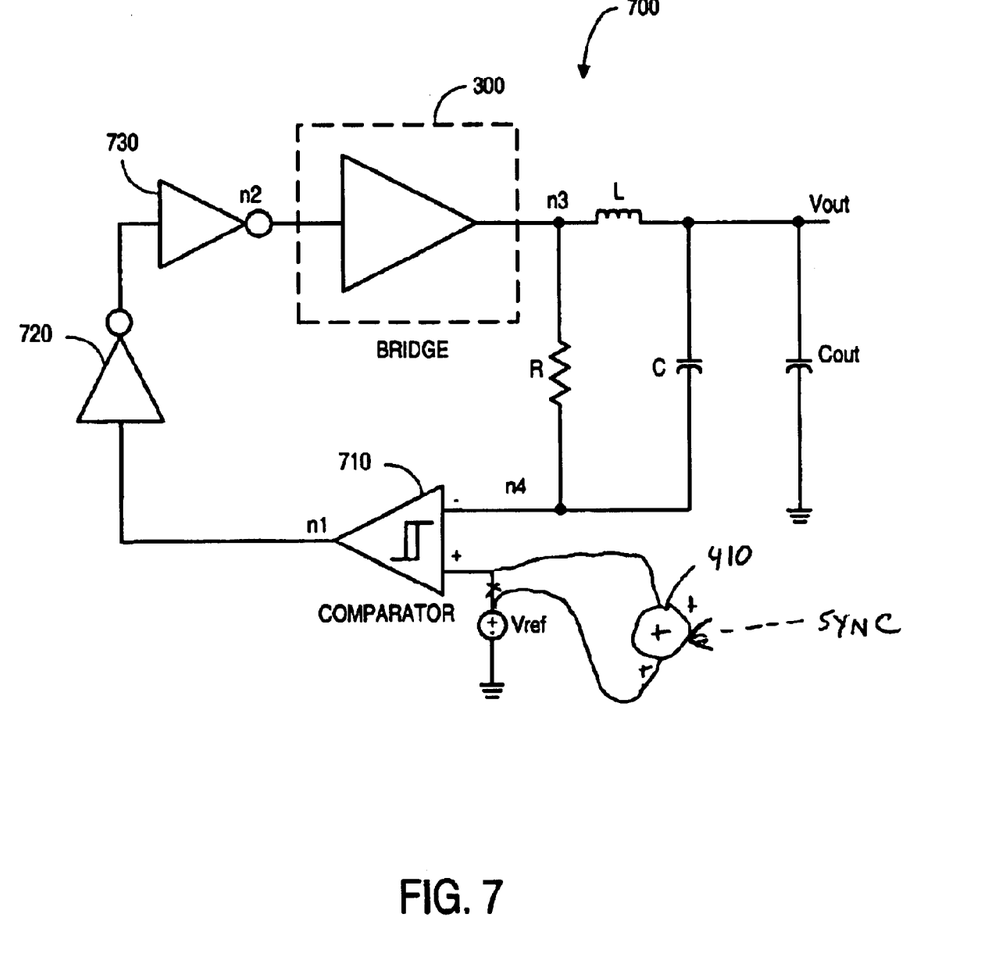
FIG. 7 is a diagram of a hysteretic converter circuit that may improve transient response according to some embodiments.

FIG. 7 is a diagram of a hysteretic converter circuit 700 that may improve transient response according to some embodiments. Note that portions of the circuit 700 are similar to the traditional bang-bang DC-DC converter 200 illustrated in FIG. 2. That is, the circuit 700 includes an output voltage line to provide $V_{OUT}$ and a hysteretic comparator 710 to receive $V_{REF}$ via a first input. According to some embodiments, a synchronization signal may also be associated with one of the inputs of the hysteretic comparator 710 (e.g., the synchronization signal maybe superimposed on $V_{REF}$ as illustrated by the dashed arrow and adder 410).

The circuit 700 also includes a switching bridge 300 that receives a signal associated with an output of the hysteretic comparator 710. For example, the output of the hysteretic comparator 710 (i.e., at node 1 or "n1") may pass through inverters 720, 730 and/or other devices (e.g., buffers) before reaching the switching bridge 300 (i.e., at n2). According to other embodiments, the switching bridge 300 is an inverting switching bridge (in which case, an add number of invertors may be provided between n1 and n2).

The switching bridge 300 may then provide a signal (i.e., at n3) that is associated with $V_{OUT}$ and a second input of the hysteretic comparator 710 (i.e., at n4). Note that the signal may be provided to the output voltage line via an inductor L. Similarly, the signal from the switching bridge 300 may be provided to the second input of the hysteretic comparator 710 via a resister R. Also note that a capacitor $C_{OUT}$ may be provided between the output voltage line and ground.

According to this embodiment, the feedback of the circuit 700 is modified by having a capacitor C coupled to the output voltage line and the second input of the hysteretic comparator 710 (i.e., at n4).

The capacitor C may act to improve a transient response of the circuit 700. For example, without capacitor C the switching frequency of the circuit 700 may be sensitive to parameters L and $C_{OUT}$. In many cases, however, $C_{OUT}$ will change depending on the loading circuit. The addition of capacitor C acts to reduce this dependency on L and $C_{OUT}$.

The RC network in FIG. 7 may estimate the current flowing through inductor L, and the hysteretic comparator 710 may toggle when the estimated inductor current exceeds approximately one half of the hysteresis window width. Recall that capacitor C is connected to $V_{OUT}$ and n4. As a result, when $V_{OUT}$ droops due to increased load current the change may be sensed at n4—causing the switching bridge 300 to connect inductor L to the positive supply voltage. Therefore, the load transient response of the circuit 700 may be improved.

Assuming no output voltage ripple, the following relationship may exist between the RC time constant and the output voltage variation:

$$\Delta V_{out,max} = \frac{\Delta I_{out,max} L}{RC}$$

where:

$\Delta V_{out,\,max}$ is associated with output voltage variation;

$\Delta I_{out,\,max}$ is associated with output current variation;

L is associated with the inductor; and

RC is associated with the time constant of the RC network.

Moreover, the operating frequency of the circuit 700 may be associated with:

$$V_h = D(1-D) \frac{V_{in}}{f_s RC}$$

where:

$V_h$ is associated with the hysteresis band;

D is associated with duty cycle;

$V_{in}$ is associated with input voltage;

$f_s$ is associated with switching frequency; and

RC is associated with the time constant of the RC network.

As a result of the improved transient response, the hysteretic converter circuit 700 may support increased microprocessor slew rates, allow a reduction of on-die de-coupling capacitance, and/or reduce leakage current.

Figure 8:
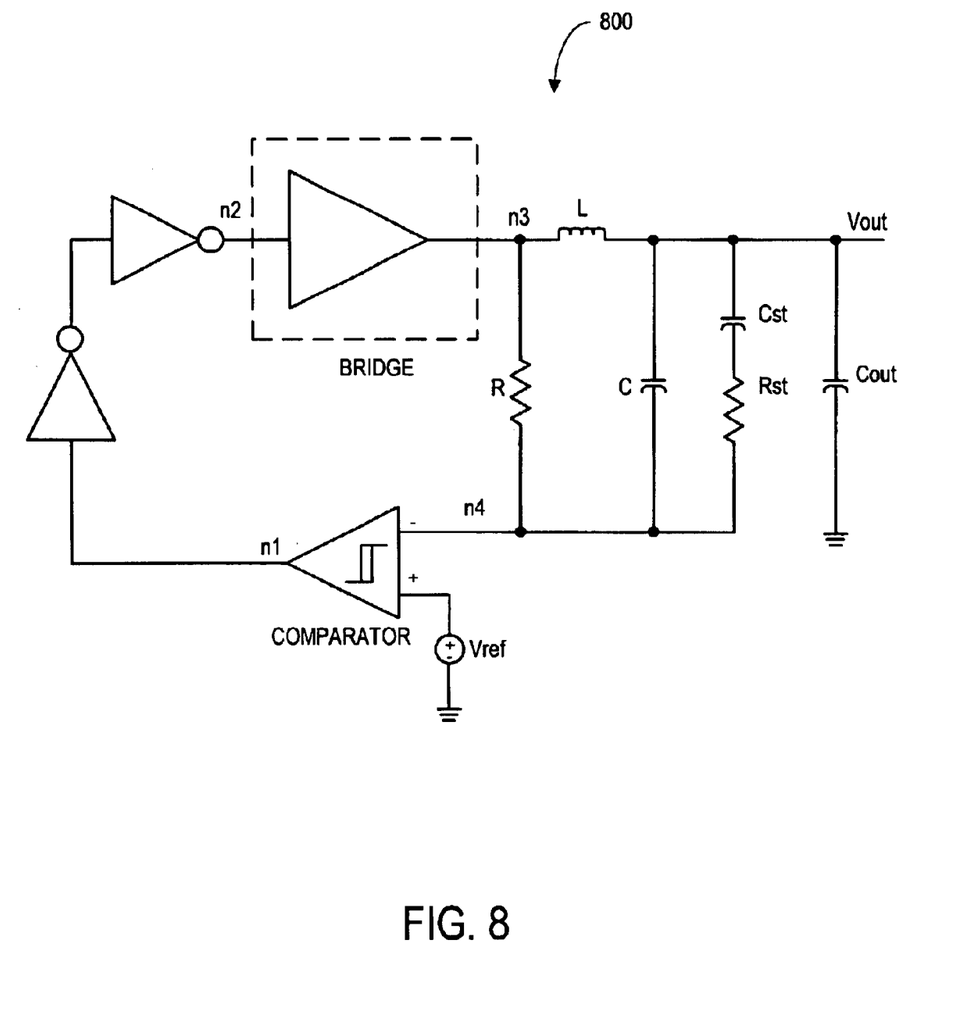
FIG. 8 is a diagram of a hysteretic converter circuit that may improve frequency stability according to some embodiments.

FIG. 8 is a diagram of a hysteretic converter circuit 800 that may improve frequency stability according to some embodiments. The circuit 800 is similar to the circuit 700 described with respect to FIG. 7, but a resistor RST and a capacitor CST in series are now coupled between the output voltage line and the second input of the hysteretic comparator (i.e., at n4). Note the inductor L current may have a triangular waveform. To prevent distortion of the triangular shape of the voltage at n4 by output voltage ripple, the series $R_{ST}$-$C_{ST}$ network is connected in parallel with capacitor C. As a result, the circuit 800 may be more robust with respect to output ripple noise (and switching frequency may be stabilized). Note that the series $R_{ST}$-$C_{ST}$ network may be used without utilizing the other embodiments described herein.

Figure 9:
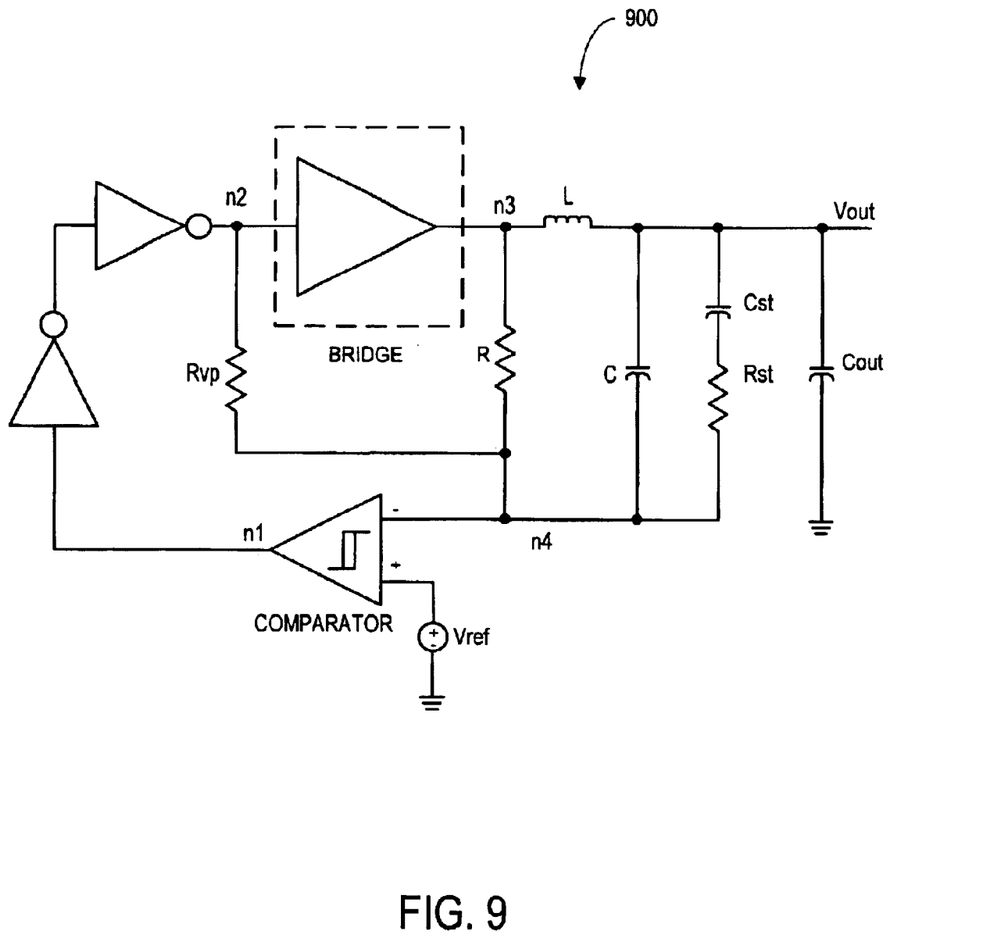
FIG. 9 is a diagram of a hysteretic converter circuit that may provide voltage positioning according to some embodiments.

FIG. 9 is a diagram of a hysteretic converter circuit 900 that may provide voltage positioning according to some embodiments. Without voltage positioning, the DC output impedance of a converter may be much smaller than its high-frequency AC impedance. As a result, the AC impedance may cause an undershoot of $V_{OUT}$ upon a step increase in load current (although after some time $V_{OUT}$ will rise because of the smaller value of DC impedance). Similarly, $V_{OUT}$ will overshoot if the current ceases. Both the undershoot and overshoot may degrade the transient response of the converter and increase voltage fluxuations. A purpose of voltage positioning is to increase the DC impedance such that the impedance does not vary substantially with frequency (e.g. to reduce any voltage overshoot).

The circuit 900 is similar to the circuit 800 described with respect to FIG. 8, but a resistor $R_{VP}$ has been added between the input of the switching bridge (i.e., at n2) and the second input of the hysteretic comparator (i.e., at n4) to provide voltage positioning (e.g., to enable constant output impedance over substantially the full frequency range of load current transients). When current increases, $V_{OUT}$ will "position" to a smaller value. When current ceases, $V_{OUT}$ returns to its original value.

In FIG. 9, the average voltage at n2 depends on the duty cycle and input supply voltage. The average voltage at n3 is the average voltage at n2 diminished by an I*R voltage droop across the bridge:

$$V_{droop} = \frac{R}{R_{vp} + R} R_{brdg} \times I_{out} = R_{out} \times I_{out}$$

where:

$I_{out}$ is associated with load current;

$V_{droop}$ is associated with a change in $V_{OUT}$ due to applied load current;

$R_{brdg}$ is associated with switching bridge resistance; and $R_{out}$ is associated with output resistance.

For this circuit 900, the output impedance may be adjusted from zero to $R_{brdg}$ by selecting an appropriate value for $R_{VP}$. Moreover, the use of voltage positioning may reduce output voltage fluctuations (e.g., by one half). Note that the resistor $R_{VP}$ may be used without utilizing the other embodiments described herein.

Figure 10:
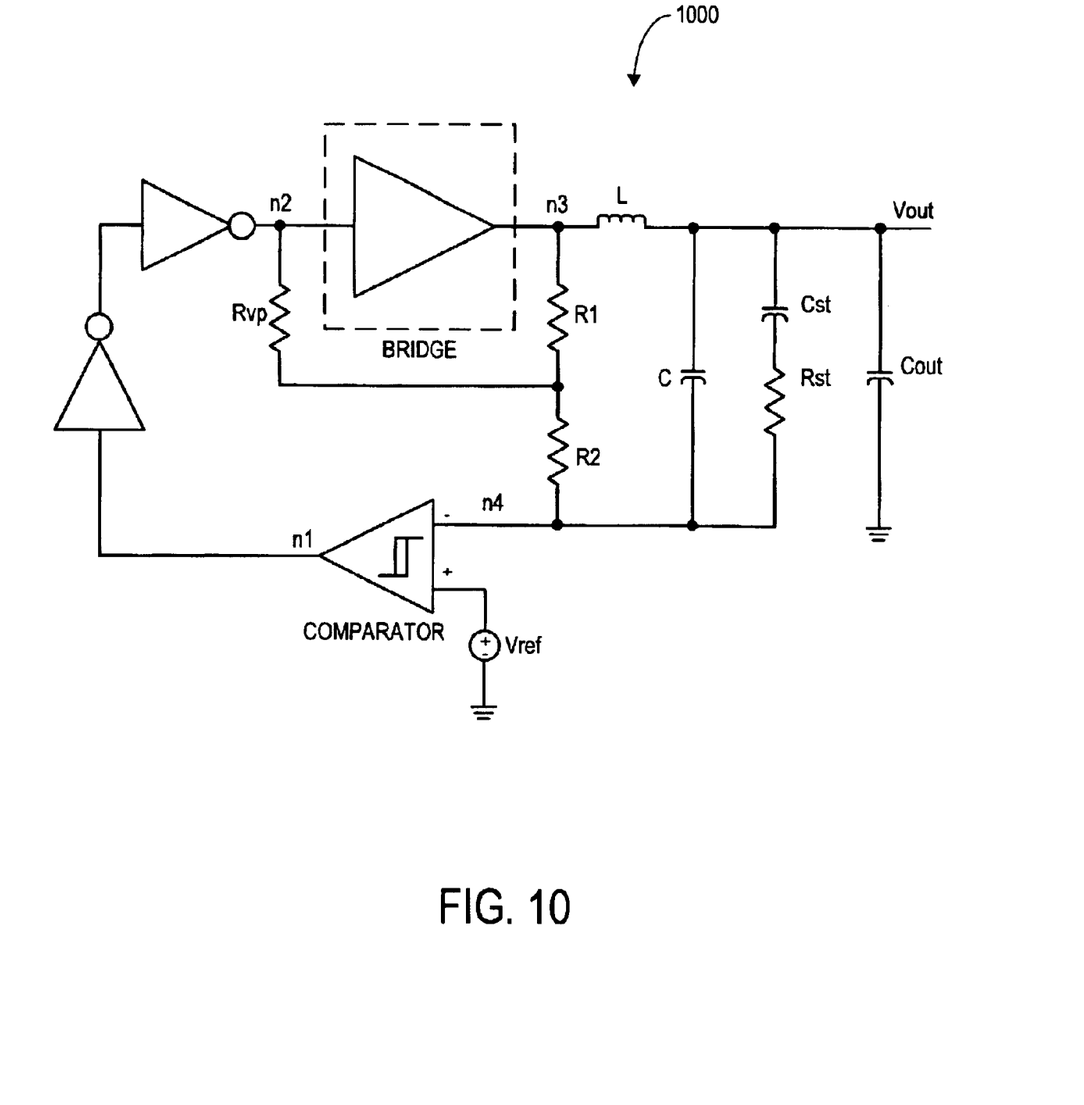
FIG. 10 is a diagram of a hysteretic converter circuit according to some embodiments.

FIG. 10 is a diagram of a hysteretic converter circuit 1000 according to some embodiments. The circuit 1000 is similar to the circuit 900 described with respect to FIG. 9, but resistor $R_{VP}$ is now coupled to n2 and a point between a pair of resistors R1, R2 which are, in turn, coupled in series between n3 and n4. As a result, the circuit 1000 may use less total resistance (e.g., saving area in monolithic implementations).

Accurate voltage positioning may enable implicit current sharing among single-phase converters in multi-phase configurations (e.g., such as the multi-phase converter 500 described with respect to FIG. 5). Note that the output current Iout and the droop voltage $V_{DROOP}$ may be related. That is, if the outputs of several single-phase converters are connected in parallel, then all of the single-phase converters may experience similar voltage droops. As a result, each single-phase converter may provide substantially the same output current. Note that the accuracy of current sharing may be limited by the accuracy of voltage positioning between any two single-phase converters:

$$I_{mm} = \frac{V_{mm}}{R_{out}} = \frac{V_{mm}}{V_{droop}} \times I_{out}$$

where:

$I_{mm}$ is associated with a difference in output currents of two single-phase converters; and $V_{mm}$ is associated with a voltage positioning mismatch of two single-phase converters.

Thus, for a 10% current mismatch between single-phase converters, the mismatch voltage $V_{MM}$ maybe less than 10% of $V_{DROOP}$.

Figure 11:
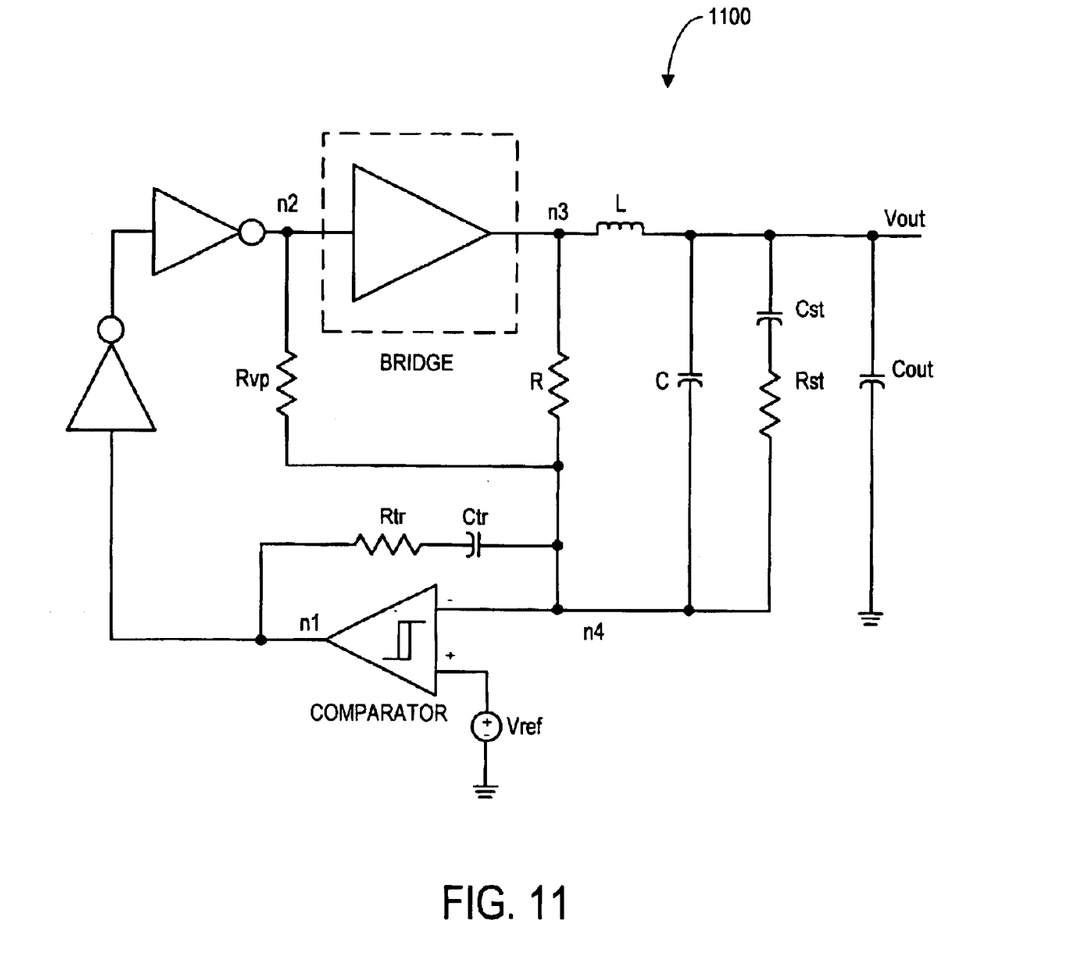
FIG. 11 is a diagram of a hysteretic converter circuit according to some embodiments.

FIG. 11 is a diagram of a hysteretic converter 1100 circuit according to some embodiments. The circuit 1100 is similar to the circuit 900 described with respect to FIG. 9, but a resister $R_{TR}$ and a capacitor $C_{TR}$ in series are now coupled to the output of the hysteretic comparator and the second input of the hysteretic comparator. These components may provide a small delay at the comparator output (ie., n1) and help shape the triangular waveform at n4. Note that $R_{TR}$ and $C_{TR}$ may be used without utilizing the other embodiments described herein.

Figure 12:
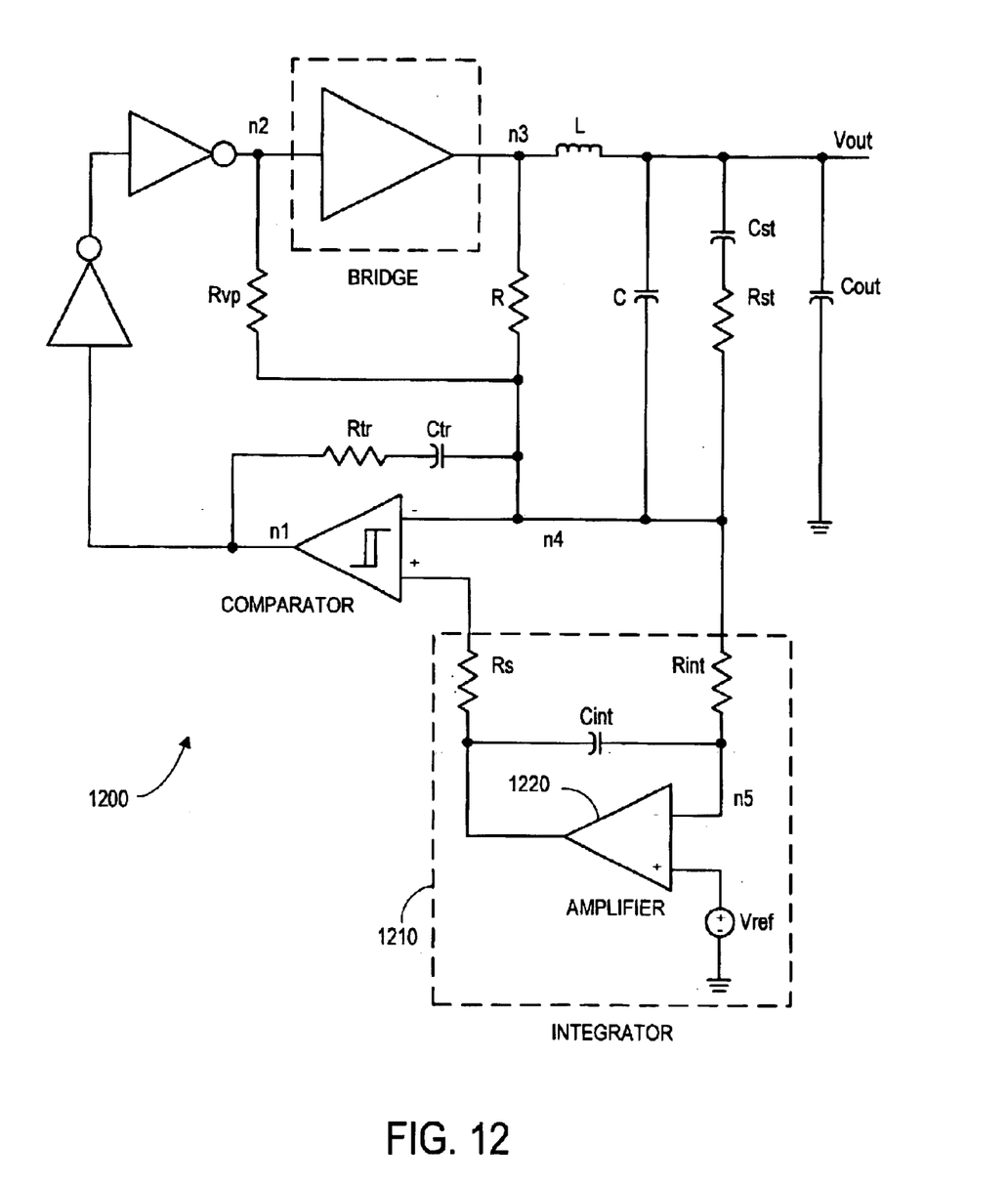
FIG. 12 is a diagram of a hysteretic converter circuit with an integrator according to some embodiments.

FIG. 12 is a diagram of a hysteretic converter circuit 1200 according to some embodiments. The circuit 1200 is similar to the circuit 1100 described with respect to FIG. 11, but the input of $V_{REF}$ to the hysteretic comparator via the first input has been replaced with an integrator 1210. Note that a fast hysteretic comparator often exhibits a larger input voltage offset as compared to an amplifier. As a result, the offset of the hysteretic comparator in the converter circuit 1200 may be corrected by the integrator 1210.

In particular, the integrator 1210 includes an amplifier 1220 (e.g., an operational amplifier) that receives $V_{REF}$ via a first input. Note that the offset voltage of the amplifier 1220 may be less than the offset voltage of the hysteretic comparator.

The output of the amplifier 1220 is provided to the comparator (e.g., in place of $V_{REF}$). Moreover, a capacitor $C_{INT}$ is coupled between the output of the amplifier 1220 and a second input of the amplifier (i.e., at n5). The second input of the amplifier 1220 is further coupled to n4 via another resistor $R_{INT}$. According to some embodiments, the time constant $R_{INT}*C_{INT}$ is significantly higher than the time constant $R*C$.

According to some embodiments, the output of the amplifier 1220 may be provided to the comparator through another resistor $R_S$. In this case, the resistor $R_S$ may be associated with a synchronization signal (e.g., such as a signal used in connection with a multi-phase converter as described with respect to FIG. 5).

Note that the integrator 1210 may be used without utilizing the other embodiments described herein.

Integrated Circuit

Figure 13:
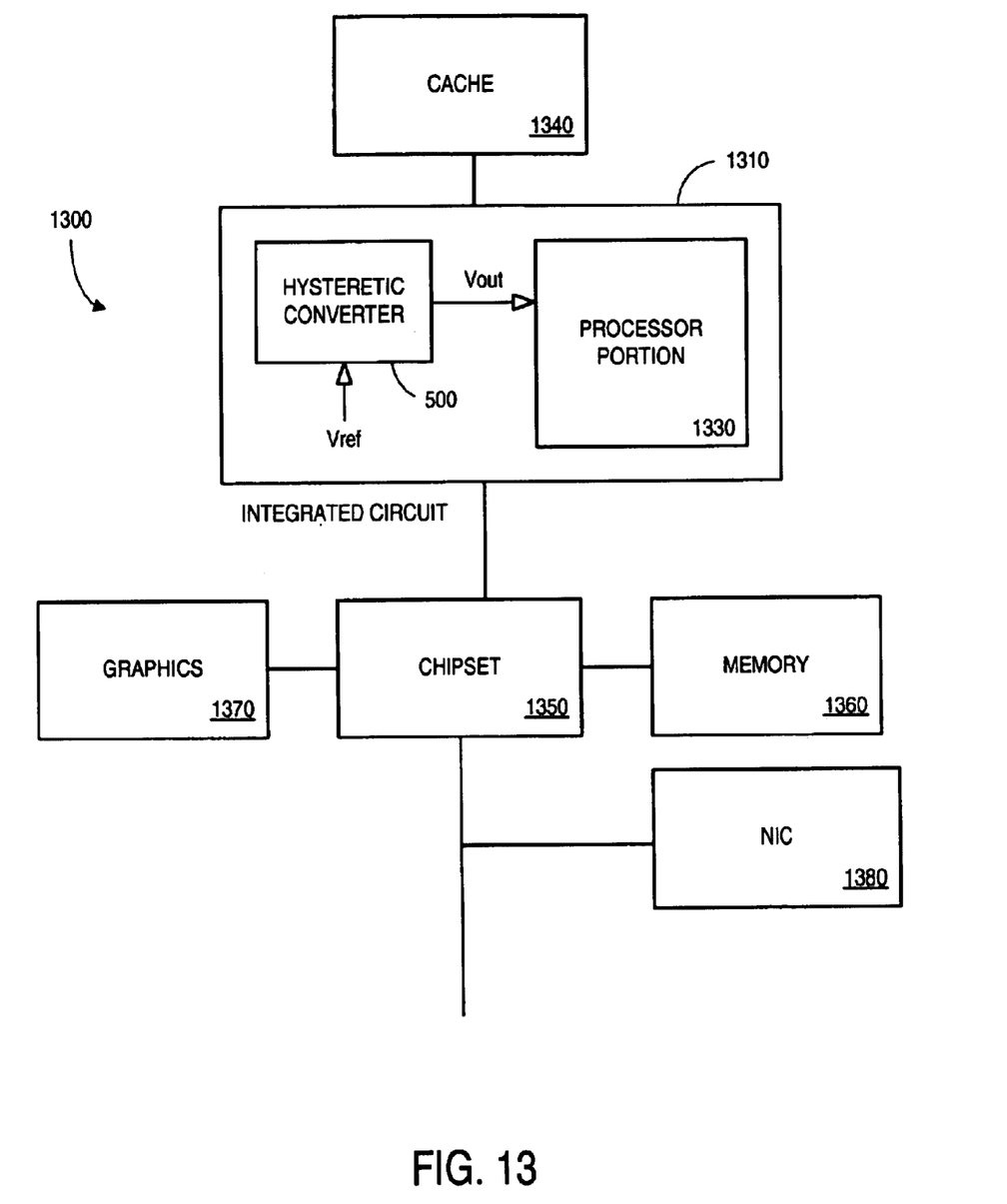
FIG. 13 is a block diagram of a system including an integrated circuit according to some embodiments.

FIG. 13 is a block diagram of a system 1300 including an integrated circuit 1310 according to some embodiments. The integrated circuit 1310 includes a hysteretic converter 500 that receives $V_{REF}$ and provides $V_{OUT}$ to a processor portion 1330. The hysteretic converter 500 may utilize any of the embodiments described herein According to some embodiments, the hysteretic converter 500 is instead located outside of the integrated circuit 1310. Moreover, the integrated circuit 1310 may be a processor or any other type of integrated circuit. According to some embodiments, the integrated circuit 1310 also communicates with an off-die cache 1340. The integrated circuit 1310 may also communicate with a system memory 1360 via a host bus and a chipset 1350. In addition, other off-die functional units, such as a graphics accelerator 1370 and a Network Interface Controller (NIC) 1380 may communicate with the integrated circuit 1310 via appropriate busses.

Thus, embodiments have been described to provide a power converter with improved output voltage control (i.e., small output voltage ripple), high efficiency, fast transient response (e.g., up to 1 GHz), and/or small input current ripple.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although various embodiments and combinations of embodiments have been described herein, the embodiments may be used in any practicable combination (e.g., a multi-phase hysteretic DC-DC converter might use single-phase converters with resistor Rvp but not capacitor C). Moreover, although embodiments have been described to generate a single $V_{OUT}$ value, the embodiments may be used to generate any number of $V_{OUT}$ values (e.g., a first output voltage for a microprocessor core and a second output voltage for an IO buffer). In addition, although specific circuits and components have been described, embodiments may be implemented using other or additional circuits and/or components.

The several embodiments described herein are solely for the purpose of illustration. Persons skilled in the art will recognize from this description other embodiments may be practiced with modifications and alterations limited only by the claims.

What is claimed is:

1. An apparatus, comprising:
an output voltage line to provide an output voltage; and
a plurality of parallel single-phase hysteretic converters, wherein each converter is coupled to the output voltage line and is to operate in accordance with an associated synchronization signal, wherein each converter includes a hysteretic comparator and the associated synchronization signal is introduced via an input of the hysteretic comparator.

2. The apparatus of claim 1, wherein the synchronization signals are phase shifted such that the distribution of the synchronization signals over a clock period is substantially uniform.

3. The apparatus of claim 1, wherein the synchronization signals have a triangular shape.

4. The apparatus of claim 1, wherein the apparatus comprises a multi-phase DC-DC power convener and the output voltage is associated with a processor.

5. The apparatus of claim 1, further comprising:
a reference voltage line to receive a reference voltage, wherein each converter receives the associated synchronization signal superimposed on the reference voltage.

6. The apparatus of claim 5, wherein the synchronization signals have a relatively small magnitude as compared to the reference voltage.

7. The apparatus of claim 5, wherein each convener comprises:
a hysteretic comparator to receive the reference voltage combined with the synchronization signal associated with that converter; and
a switching bridge to receive a signal associated with an output of the hysteretic comparator and to provide a signal associated with an input of the hysteretic comparator.

8. The apparatus of claim 7, wherein the switching bridge is associated with one of: (i) a p-channel metal-oxide-semiconductor device and a diode and (ii) a p-channel metal-oxide-semiconductor device and an n-channel metal-oxide-semiconductor device.

9. The apparatus of claim 7, wherein the magnitude of the synchronization signals are associated with a hysteresis window width of the hysteretic converters.

10. An apparatus, comprising:
an output voltage line to provide an output voltage;

a hysteretic comparator to receive via a first input a signal associated with a reference voltage and a synchronization signal, the synchronization signal having a relatively small magnitude as compared to the reference voltage; and a switching bridge to receive a signal associated with an output of the hysteretic comparator and to provide a signal associated with the output voltage and a second input of the hysteretic comparator, wherein the hysteretic comparator receives via the first input a signal comprising the synchronization signal added to the reference voltage.

11. A method of facilitating DC to DC power conversion, comprising:

generating a plurality of synchronization signals; and providing each of the synchronization signals to an associated single-phase hysteretic converter, wherein each convener includes a hysteretic comparator and the associated synchronization signal is provided via an input of the hysteretic comparator.

12. The method of claim 11, wherein the synchronization signals are phase shifted such that the distribution of the synchronization signals over a clock period is substantially uniform.

13. The method of claim 11, wherein the converters operate in parallel.

14. The method of claim 11, wherein the synchronization signals are provided to the converters by adding the signals to a reference voltage.

15. A system, comprising:

a chipset; and a die comprising a microprocessor in communication with the chipset, wherein the microprocessor includes a power converter comprising:

a reference voltage line to receive a reference voltage, an output voltage line to provide an output voltage, and a plurality of parallel single-phase hysteretic converters, wherein each converter is coupled to the output voltage line and is to operate in accordance with an associated synchronization signal, wherein each converter includes a hysteretic comparator and the associated synchronization signal is introduced via an input of the hysteretic comparator.

16. The system of claim 15, wherein the power converter comprises a multi-phase DC-DC power converter.

17. An apparatus, comprising:

an output voltage line to provide an output voltage; and a plurality of parallel single-phase hysteretic converters, wherein at least a first converter of the plurality of converters includes:

a hysteretic comparator to receive a reference voltage via a first input;

a switching bridge to receive a signal associated with an output of the hysteretic comparator and to provide a signal associated with the output voltage and a second input of the hysteretic comparator;

a first and second resistor in series coupled to the output of the switching bridge and the second input of the hysteretic comparator; and a third resister coupled to the input of the switching bridge and a point between the first and second resistors.

18. The apparatus of claim 17, wherein the first converter comprises a DC-DC power converter.

19. An apparatus, comprising:

an output voltage line to provide an output voltage; and a plurality of parallel single-phase hysteretic converters, wherein each of the plurality of converters includes:

a hysteretic comparator to receive a reference voltage via a first input;

a switching bridge to receive a signal associated with an output of the hysteretic comparator and to provide a signal associated with the output voltage and a second input of the hysteretic comparator; and a capacitor coupled to the output voltage line and the second input of the hysteretic comparator.

20. The apparatus of claim 19, wherein the first converter comprises a DC-DC power converter and the capacitor improves a transient response of the converter.

21. The apparatus of claim 19, wherein at least one of an inverter and a buffer is positioned between the output of the hysteretic comparator and the input of the switching bridge.

22. The apparatus of claim 19, wherein an inductor is positioned between the output of the switching bridge and the output voltage line.

23. The apparatus of claim 19, wherein a resistor is positioned between the output of the switching bridge and the second input of the hysteretic converter.

24. The apparatus of claim 19, wherein another capacitor is positioned between the output voltage line and ground.

25. An apparatus, comprising:

an output voltage line to provide an output voltage; and a plurality of parallel single-phase hysteretic converters, wherein each of the plurality of converters includes:

a hysteretic comparator to receive a reference voltage via a first input;

a switching bridge to receive a signal associated with an output of the hysteretic comparator and to provide a signal associated with the output voltage and a second input of the hysteretic comparator;

a capacitor coupled to the output voltage line and the second input of the hysteretic comparator; and a resistor-capacitor series coupled to the output voltage line and the second input of the hysteretic comparator.

26. The apparatus of claim 25, wherein the first converter comprises a DC-DC power converter and the resistor-capacitor series improves a frequency stability of the converter.

27. An apparatus, comprising:

an output voltage line to provide an output voltage; and a plurality of parallel single-phase hysteretic converters, wherein each of the plurality of converters includes:

a hysteretic comparator to receive a reference voltage via a first input;

a switching bridge to receive a signal associated with an output of the hysteretic comparator and to provide a signal associated with the output voltage and a second input of the hysteretic comparator; and a resistor coupled to the input of the switching bridge and the second input of the hysteretic comparator.

28. The apparatus of claim 27, wherein the first converter comprises a DC-DC power converter and the resistor facilitates voltage positioning for the converter.

29. The apparatus of claim 27, further comprising a resister and capacitor in series coupled to the output of the hysteretic comparator and the second input of the hysteretic comparator.

30. A An apparatus, comprising:

an output voltage line to provide an output voltage; and a plurality of parallel single-phase hysteretic converters, wherein at least a first converter of the plurality of converters includes:

an integrator, including:

an amplifier to receive a reference voltage via a first input, and a capacitor coupled to the output of the amplifier and a second input of the amplifier;

a hysteretic comparator to receive via a first input a signal associated with the output of the amplifier;

a switching bridge to receive a signal associated with an output of the hysteretic comparator and to provide a signal associated with the output voltage and a second input of the hysteretic comparator; and a first resistor coupled to a second input of the amplifier and the second input of the hysteretic comparator.

31. The apparatus of claim 30, further comprising:

a second resistor between the output of the amplifier and the first input of the hysteretic comparator.

32. The apparatus of claim 31, wherein the second resistor is associated with a synchronization signal.

33. The apparatus of claim 30, wherein an offset voltage associated with the amplifier is less than an offset voltage associated with the hysteretic comparator.

* * * * *